United States Patent [19]
Sasagaki et al.

[11] Patent Number: 5,634,154
[45] Date of Patent: May 27, 1997

[54] DISPLAY SYSTEM AND METHOD FOR A CAMERA

[75] Inventors: Nobuaki Sasagaki; Takashi Saegusa, both of Kanagawa-ken, Japan

[73] Assignee: Nikon Corporation, Tokyo, Japan

[21] Appl. No.: 378,351

[22] Filed: Jan. 25, 1995

[30] Foreign Application Priority Data

Jan. 31, 1994 [JP] Japan .................. 6-025950

[51] Int. Cl.⁶ .................. G03B 17/18; G03B 17/00
[52] U.S. Cl. .................. 396/291; 396/299
[58] Field of Search .................. 354/471, 484, 354/412, 465, 474, 475, 289.1, 289.12; 396/281, 287, 288, 289, 290, 291, 292, 296–300

[56] References Cited

U.S. PATENT DOCUMENTS

| 5,191,373 | 3/1993 | Nakano | 354/474 |
| 5,218,399 | 6/1993 | Izumi et al. | 354/471 |
| 5,298,936 | 3/1994 | Akitake et al. | 354/471 |

FOREIGN PATENT DOCUMENTS

| 4-81731 | 3/1992 | Japan . |
| 4-81732 | 3/1992 | Japan . |
| 4-81733 | 3/1992 | Japan . |
| 4-81734 | 3/1992 | Japan . |

OTHER PUBLICATIONS

Nikon model N50, SLR, camera 1994.
Hewlett Packard model 48SX, hand held calculator Aug. 1990.

*Primary Examiner*—Safet Metjahic
*Assistant Examiner*—Eric Nelson
*Attorney, Agent, or Firm*—Oliff & Berridge

[57] ABSTRACT

A display and method for selecting a control mode or an operational parameter of a camera utilizes a display screen located laterally adjacent a plurality of switches on the camera. During a first display condition, a plurality of control mode symbols are displayed on the display screen, each control mode symbol appearing adjacent a corresponding switch. Indicators on the display screen indicate which of the plurality of switches may by operated to select each control mode. During a second display condition, at least one operational parameter is displayed on the display screen. The indicators indicate which of the switches correspond to each displayed opertional parameter, and which of the switches to operate to change the displayed operational parameter. The indicators may also indicate how the displayed operational parameter will change upon operation of each of the switches.

14 Claims, 10 Drawing Sheets

| | 00 | 10 | 20 | 30 | 40 | 50 | 60 | 70 | 80 | 90 | A0 | B0 | C0 | D0 | E0 | F0 |
|---|---|---|---|---|---|---|---|---|---|---|---|---|---|---|---|---|
| 0 | 0 | .0 | | P | 0 | p | . | | ☱ | P | ⇐ | ☷ | A | ☼ | ⚠ | |
| 1 | 1 | .1 | A | Q | 1 | q | , | | ☱ | P | ⇐ | ☷ | A | ☼ | ⚠ | |
| 2 | 2 | .2 | B | R | 2 | r | · | | ▲ | S | ⇒ | ☶ | ↯ | ☽ | ? | |
| 3 | 3 | .3 | C | S | 3 | s | · | | ▲ | S | ⇒ | ☶ | ↯ | ☽ | ? | |
| 4 | 4 | .4 | D | T | 4 | t | ♦ | | ♃ | A | ◨ | — | ☻ | ▭ | | |
| 5 | 5 | .5 | E | U | 5 | u | - | | ♃ | A | ◨ | — | ☻ | ▭ | | |
| 6 | 6 | .6 | F | V | 6 | v | ± | | ♛ | M | ⊠ | ⊥ | ♫ | ▭ | | |
| 7 | 7 | .7 | G | W | 7 | w | ∗ | | ♛ | M | ⊠ | ⊥ | ♫ | ▭ | | |
| 8 | 8 | .8 | H | X | 8 | x | ‹ | | ⚘ | ⌂ | ♫ | ♠ | ⚐ | — | | |
| 9 | 9 | .9 | I | Y | 9 | y | › | | ⚘ | ⌂ | ♫ | ♠ | ⚐ | — | | |
| A | 0 | 1. | J | Z | 0 | z | = | | ⚑ | ⌂ | ◉ | ⚏ | ⊙ | | | |
| B | | | K | | k | | : | | ⚑ | ⌂ | ◉ | ⚏ | ⊙ | | | |
| C | | | L | | l | | / | | ⌥ | 151 | S | 🏠 | ⚌ | Eπ | | |
| D | | | M | | m | | ? | | ⌥ | 151 | S | 🏠 | ⚌ | Eπ | | |
| E | | | N | | n | | ! | | ⚒ | ⌘ | C | 🏠 | AF | ♈ | | ▩ |
| F | | | O | | o | | ‖ | | ⚒ | ⌘ | C | 🏠 | AF | ♈ | | ▩ |

FIG. 11

DISPLAY SYSTEM AND METHOD FOR A CAMERA

BACKGROUND OF THE INVENTION

Related Subject Matter

This application is directed to subject matter that is related to subject matter in co-pending U.S. patent application Ser. No. (08/377, 604 entitled "Camera Equipped With Warning Function and Method," Ser. No. 08/377,839 entitled "Camera for Selectively Inputting Operating Parameters and Method," Ser. No. 08/377,838 entitled "Camera Input and Display Device With Timer and Method," Ser. No. 08/377, 840 entitled "Camera With Film Sensitivity Setting Function and Method," Ser. No. 08/377,836 entitled "Camera Display System and Method," Ser. No. 08/378,449 entitled "Camera and Method for Assuring Photography With Selected Parameter,"Ser. No. 08/377,825 entitled "Camera With Simplified Parameter Selection and Dual Mode Operation and Method of Operation", filed simultaneously herewith by the same inventors, which are all hereby incorporated by reference.

1. Field of the Invention

The present invention relates to display systems for cameras and more particularly, to dot matrix display systems for cameras.

2. Description of Related Art

There are cameras that, for example, change and display on a display screen the names of camera control modes and the camera setting values. The camera control mode may be set to the shutter priority (S) mode, the aperture priority (A) mode, or the manual (M) mode when a switch is operated. The display may indicate the current control mode and the current setting values of the camera and may allow the user to change the control mode or the setting values.

However, with conventional cameras, the operation of the switches used to display the control mode names and to change the corresponding setting values is troublesome, and immediate change of a setting value corresponding to a desired control mode is difficult.

SUMMARY OF THE INVENTION

The present invention is aimed at solving the problems described above, and it is an object of the present invention to provide a display and selection system for a camera wherein selection of the desired control mode and display and change of the corresponding setting values are easily understood and easily and quickly accomplished. A method is also provided.

In order to achieve the object described above and other objects, the present invention provides a display and selection system for a camera that includes a display screen with a plurality of display blocks, each display block being comprised of a plurality of smaller dot matrix display units. The display and selection system also includes a plurality of operation devices for selecting a camera control mode or for altering the camera settings. The operation devices can take the form of small switches located laterally adjacent the display screen, and at least one of the operation devices corresponds to each of the display blocks. The display screen also includes a plurality of mark displays provided between the operation devices and the display blocks. The mark display indicates which of the operation devices to operate to select a particular control mode, or which of the operation devices to operate to change a camera setting value. The display and selection system further includes a controller for controlling the display and selection system.

During an initial display condition, the controller causes a set of control mode symbols to be displayed on the display blocks, each control mode symbol being displayed in a different display block. A portion of each control mode symbol is displayed in each of the dot matrix display sections forming a single display so that a complete symbol is shown in the display block. The plurality of mark displays point to the plurality of operation devices to indicate that a particular control mode may be selected by operating a particular operation devices.

During a second display condition, which occurs after selection of the control mode, numerical values of the camera settings are displayed on selected ones of the dot matrix display units. The plurality of mark displays point to the operation devices and indicate the camera settings that can be changed, and the direction that the displayed setting will be changed by operation of each indicated operation device. In addition, warning symbols such as "low battery power" or "strobe recommended" may also be displayed in the display blocks during the second display condition.

BRIEF DESCRIPTION OF THE DRAWINGS

The invention will be described in conjunction with the accompanying drawings in which like reference numerals designate like elements and wherein.

DETAILED DESCRIPTION OF PREFERRED EMBODIMENTS

The present invention will be explained in detail hereafter, with reference to a preferred embodiment. In the preferred embodiment, the display screen includes four display blocks. Each of the four display blocks are comprised of two 8×16 dot matrix display units. It should be understood that the display screen of a camera embodying the present invention could have any number of display blocks. It should be further understood that each display block could be comprised or more than two display units, and that each display unit could have any number of dots in its dot matrix display. It should also be understood that although the mark display means are shown as triangles in the preferred embodiment, the mark display means could be comprised of any type of indicator.

Figure 2:
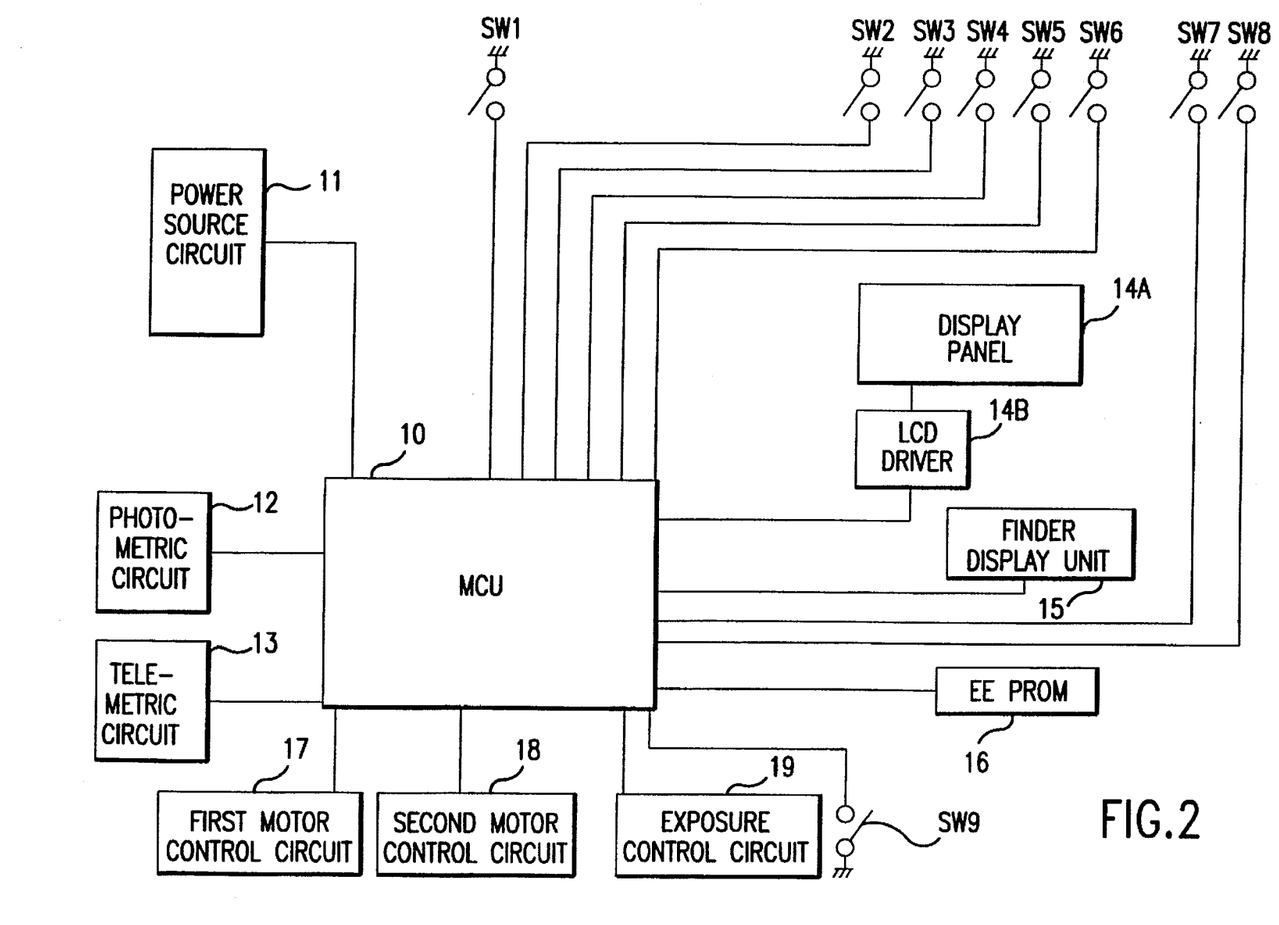
FIG. 2 is a block diagram showing the major parts of a camera embodying the present invention.

FIG. 2 shows a block diagram having the major parts of a camera embodying the present invention. In FIG. 2, 10 is a control unit (hereafter MCU), 11 is a power source circuit, 12 is a photometric circuit, 13 is a telemetric circuit, 14A is an external LCD display device having a dot matrix LCD unit and a segment display unit, 14B is an LCD driver to drive the external LCD display device 14A, 15 is a finder display unit, 16 is an EEPROM, 17 is a first motor control means to drive the lens during focusing, 18 is a second motor control means to drive scrolling of a mirror and to control winding of the film, and 19 is an exposure control means to execute aperture, shutter, and light adjustment operations.

Figure 9:
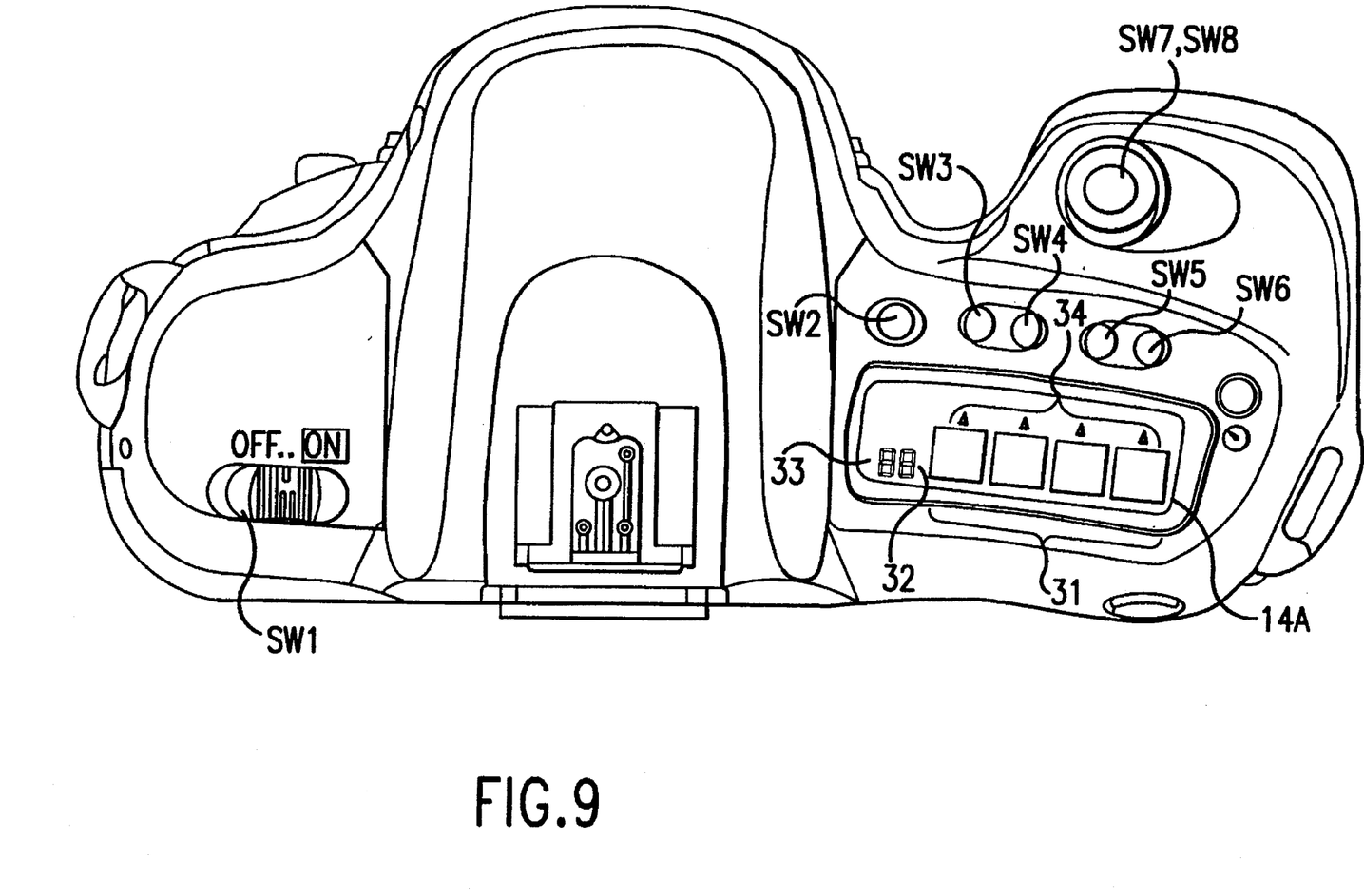
FIG. 9 is a top view of a camera embodying the present invention.

All of the switches SW1–SW9 are connected to the input port of the MCU 10. SW1 is a power source switch (main switch), SW2 is a switch corresponding to the left-most position (see FIG. 9) of the external LCD display device 14A, and SW3–SW6 are switches corresponding to first- -fourth display blocks (to be explained later). SW7 is a half-depressed switch that is turned on by the first stroke of a release button. SW8 is a release switch that is turned on by the second stroke of a release button, and SW9 is a back cover switch.

The LCD driver 14B receives signals from the MCU 10 and enables dot LCD display on the external LCD display device 14A by means of internal character generators. At the same time, it enables segment display corresponding to signals from the MCU 10 by means of an embedded decoder. Here, the finder display unit 15 is driven directly by the LCD exclusive output port. A status register M0 and a mode register M1 are defined in the RAM inside the MCU 10, and the conditions of the status and mode registers are provided in Table 1 and Table 2, respectively. A release prohibiting register M2 and a warning register M3 are also defined in the RAM of the MCU, and the conditions of the release prohibiting and warning registers are provided in Table 3 and Table 4, respectively.

TABLE 1

| M | 0 | State Register |
|---|---|---|
|   | 0 | Selected State |

TABLE 1-continued

| M | 0 | State Register |
|---|---|---|
|   | 1 | Non-Selected State |

TABLE 2

| M 1 | | |
|---|---|---|
| 1 | 0 | Mode Register |
| 0 | 0 | Program (P) Mode |
| 0 | 1 | Shutter Priority (S) Mode |
| 1 | 0 | Aperture Priority (A) Mode |
| 1 | 1 | Manual (M) Mode |

(Rows labeled 0,1,2,3 on the left)

| | 1 | 0 | Mode Register |
|---|---|---|---|
| 0 | 0 | 0 | Program (P) Mode |
| 1 | 0 | 1 | Shutter Priority (S) Mode |
| 2 | 1 | 0 | Aperture Priority (A) Mode |
| 3 | 1 | 1 | Manual (M) Mode |

TABLE 3

| M 2 | | | | | | | | |
|---|---|---|---|---|---|---|---|---|
| 7 | 6 | 5 | 4 | 3 | 2 | 1 | 0 | Release Prohibiting Register |
| X | X | X | X | X | X | X | 1 | No Battery Power Remaining |
| X | X | X | X | X | X | 1 | X | Easy Loading Warning |
| X | X | X | X | X | 1 | X | X | Rewind In Process |

TABLE 4

| M 3 | | | | | | | | |
|---|---|---|---|---|---|---|---|---|
| 7 | 6 | 5 | 4 | 3 | 2 | 1 | 0 | Warning Register |
| X | X | X | X | X | X | X | 1 | Strobe Recommended |
| X | X | X | X | X | X | 1 | X | Camera Shake Warning |
| X | X | X | X | X | 1 | X | X | Beyond High Illumination Interlocking Range |
| X | X | X | X | 1 | X | X | X | Beyond Low Illumination Interlocking Range |
| X | X | X | 1 | X | X | X | X | Battery Power is Low |

Figure 3:
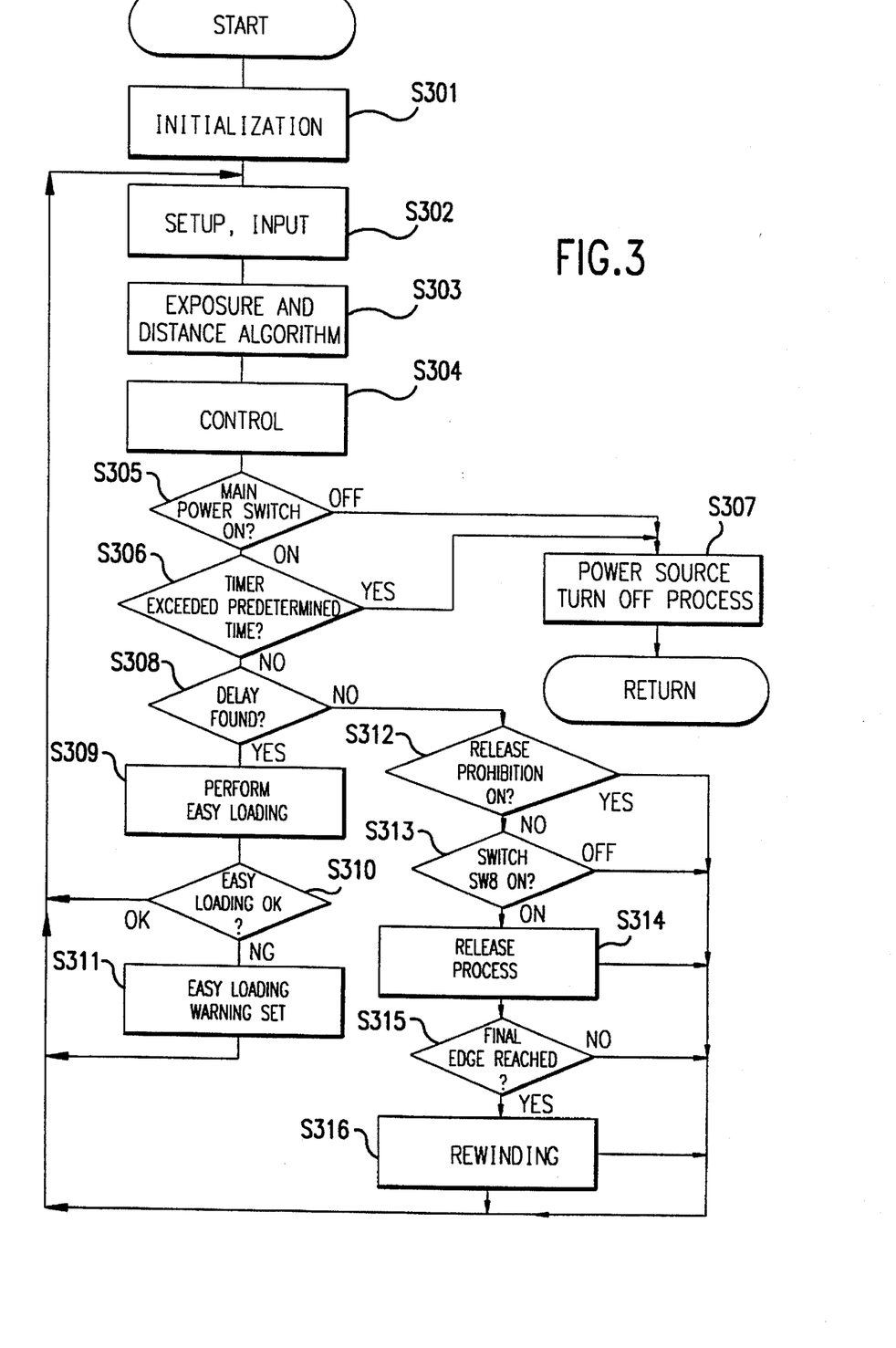
FIG. 3 is a flow chart illustrating the main routine of the control unit of the camera of FIG. 2.

FIG. 3 is a flow chart showing the main routine of the MCU 10. When either switch SW2 or SW7 is turned on, the MCU 10, which is in stand-by status (only low current is flowing), is interrupted, and the process of step S301 begins. At step S301, the MCU is initialized and the power source circuit 11 is turned on, thus turning on the main block of the MCU and enabling current to flow through the entire MCU. At step S302, an initial setting operation is executed by determining the on/off status of switches SW1–SW9. At the same time, information from the photometric circuit 12 and the telemetric circuit 13 are stored in RAM.

At this time, the battery voltage in the power source circuit is also determined. If the battery voltage is 4.5 volts or less, "1" is assigned to bit 0 of the release prohibiting register M2, and the warning flag "No Battery Power Remaining" is set. If the battery voltage is between 4.5 and 4.8 V, "1" is assigned to bit 4 of the warning register M3, and the warning flag "Battery Power Is Low" is set. Moreover, upon detecting that any of switches SW2–SW7 are on, the MCU 10 clears a power source maintenance timer (not shown).

At step S303, the exposure and distance measurement alorithm is executed based on information obtained by the photometric circuit 12 and the telemetric circuit 13 (information stored in the RAM). At this time, if input from the photometric circuit 12 indicates there is low illumination, the warning flag "Strobe Recommended" is set by assigning "1" to bit 0 of the warning register M3. If the shutter speed determined by the algorithm is 1/30 sec. or less, the warning flag "Camera Shake Warning" is set by assigning "1" to bit 1 of the warning register M3. If input from the photometric circuit 12 indicates that the illumination is too high, and that the photometric circuit 12 has gone outside its available range, or even if the photometric circuit 12 is within its range, but the illumination requires the aperture to be smaller than its limit or requires the shutter speed to be faster than its limit, the warning flag "Beyond High Illumination Interlocking Range" is set by assigning "1" to bit 2 of the warning register M3. If photometric circuit 12 detects that the illumination is too low, thus causing the photometric circuit 12 to go below its range, or even if the photometric circuit 12 is within its range, but the illumination requires the aperture to be wider than its limit or requires the shutter speed to be slower than its limit, the warning flag "Beyond Low Illumination Interlocking Range" is set by assigning "1" to bit 3 of the warning register M3.

At step S304, AF (automatic focus) control via the first motor control means 17 or display control via the LCD driver 14B is executed. At step S305, the status of the main power switch SW1 is determined. If the main power switch SW1 is on, the MCU advances to step S306, and if the main power switch SW1 is off, the MCU moves to step S307. At step S306, the time measured by the power source maintenance timer is checked. If none of the switches SW2-SW7 is found to be on at step S302, the power source maintenance timer continues measuring time. When the time measured by the power source maintenance timer exceeds a pre-assigned value, the MCU moves to step S307. If any of the switches SW2-SW7 are found to be on at step S302, the power source maintenance timer is cleared before the measured time exceeds the pre-assigned value, and the MCU advances to step S308. At step S307, the process required to shut off the power source is executed.

At step S308, the status of the back cover switch SW9 is checked. If the back cover switch SW9 is on, easy load is executed at step S309. If easy load has already been executed, a signal from the back cover switch SW9 will not be detected, and the MCU moves to step S312. At step S309, a fixed amount of film winding (easy loading) is executed by driving the second motor control means 18. At step S310, the amount of film winding during easy loading is checked, and if loading is finished before the fixed amount of winding is completed, or if easy loading is finished normally with the fixed amount of winding completed, the MCU returns to step S302. If an error is detected during film loading, at step S311, "1" is assigned to bit 1 of the release prohibiting register M2 to indicate the occurrence of an error during easy loading, and the MCU returns to step S302 after setting the "Easy Loading Warning" flag.

At step S312, the release prohibiting status is checked based on the release prohibiting register M2. If any of the warning flags of Table 3 are present, M2 is not 0, the MCU determines that the release execution is not possible (i.e., release prohibited), and the MCU returns to step S302. On the other hand, if none of the warning flags of Table 3 is present, register M2 is equal to 0, and the MCU determines that release execution is possible and advances to step S313.

At step S313, the status of the release switch SW8 is checked. If the switch is off, the MCU returns to step S302. If the switch is on, the MCU advances to step S314. At step S314, the MCU controls the second motor control means 18 and executes a known release process by driving the exposure control means 19. At step S315, the amount of film feeding is determined. If the film is not wound by one frame, the MCU determines that the film has reached the final edge (the end), and the MCU advances to step S316, where the second motor control means 18 is driven to execute the rewinding operation. Moreover, during rewinding, bit 2 of the release prohibiting register M2 is set to "1", and the "Rewind In Process" flag is set. Upon completion of the rewinding operation, the MCU returns to step S302. If one frame is wound at step S315, the MCU determines that the film is not on the final edge (the end), and the MCU returns to step S302.

Figure 4:
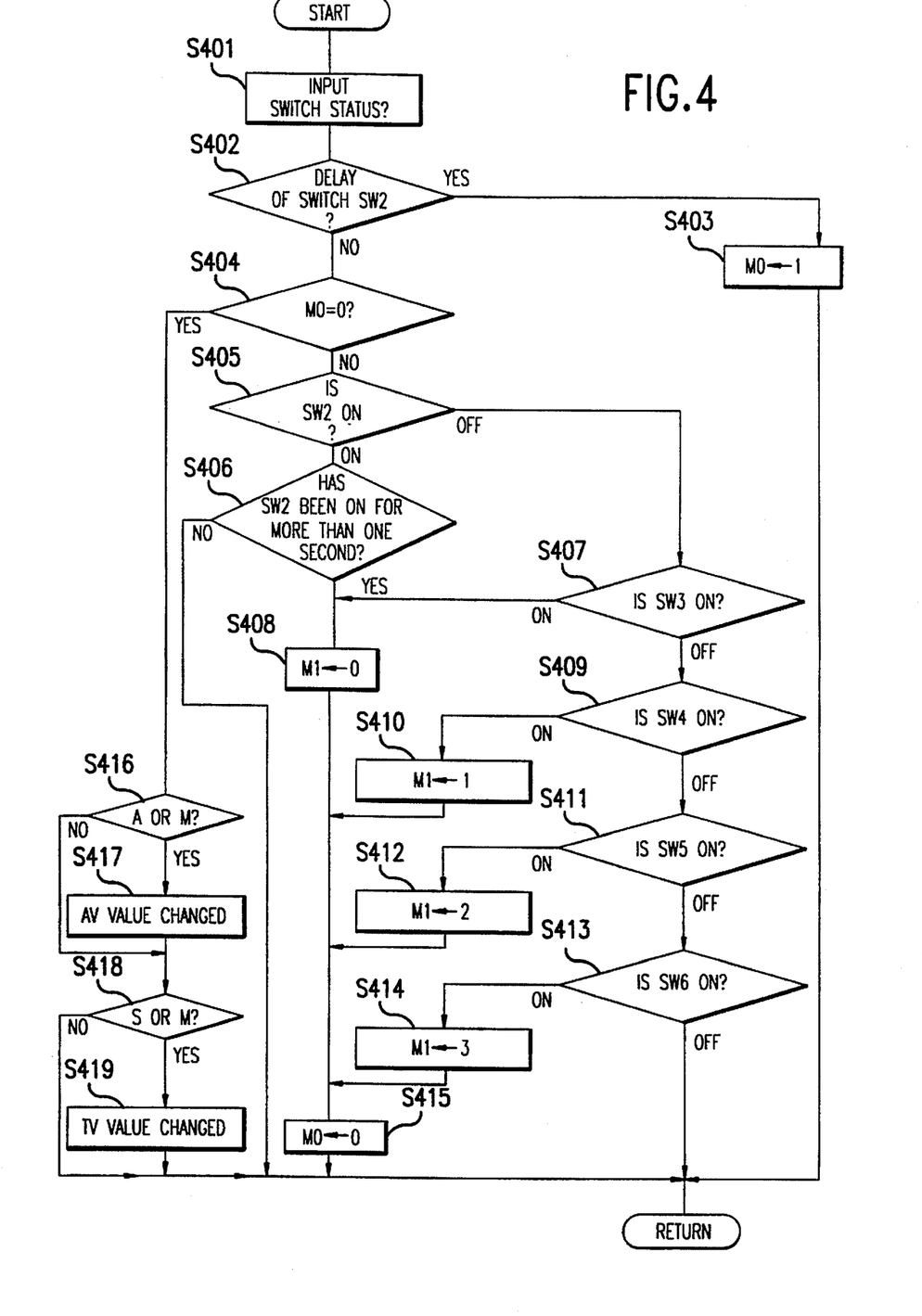
FIG. 4 is a flow chart illustrating a portion of the setting processing routine of the control unit of the camera of FIG. 2.

FIG. 4 shows a part of the setting processing routine, which is called up as a subroutine during the time of processing at step S302, as illustrated in FIG. 3. At step S401 in this subroutine, input from switches SW2-SW7 are checked, and if any of the switches are found to be on, the power source maintenance timer, to be checked at step S306 in FIG. 3, is cleared. Then, at step S402, the status of switch SW2 is checked. If switch SW2 is found to have been just turned on, the MCU advances to step S403. If switch SW2 is found to be off, or if the switch is being held down by the operator, the MCU advances to step S404. At step S403, "1" is assigned to the status register M0, indicating that the camera is in the "Non-Selected State", and the MCU returns. At step S404, the value of the status register M0 is checked. If it is "0," the MCU advances to step S416, and if it is "1," it moves to step S405.

At step S405, the status of switch SW2 is checked. If the switch SW2 is on, the MCU advances to step S406. If the switch SW2 is off, the MCU advances to step S407. At step S406, the MCU checks whether the switch SW2 has been pressed longer than one second, for example. If the switch SW2 has been pressed for one second or longer, the MCU advances to step S408; otherwise, the MCU returns. At step S407, the status of switch SW3 is checked. If the switch SW3 is on, the MCU advances to step S408. If the switch SW3 is off, the MCU moves to step S409. At step S408, the MCU sets the mode register M1 to "0" to set the control mode to program (P) mode and then advances to step S415.

At step S409, the status of SW4 is checked. If the switch is on, the MCU moves to step S410. If the switch SW4 is off, the MCU moves to step S411. At step S410, the MCU sets the mode register M1 to "1" to set the control mode to the shutter priority (S) mode and then moves to step S415. At step S411, the status of switch SW5 is checked. If the switch SW5 is on, the MCU advances to step S412. If the switch SW5 is off, the MCU moves to step S413. At step S412, the MCU sets the mode register M1 to "2" to set the control mode to aperture priority (A) mode and then moves to step S415. At step S413, the status of switch SW6 is checked. If the switch SW6 is on, the MCU advances to step S414, but the MCU returns if the switch SW6 is off. At step S414, the MCU sets the mode register M1 to "3" to set the control mode to manual (M) mode and then moves to step S415. At step S415, the MCU sets the status register M0 to "0" to indicate the camera is in the selected mode, and the MCU returns.

At step S416, the MCU determines whether the current control mode is the Aperture Priority (A) Mode or the Manual (M) Mode. If it is the Aperture Priority (A) Mode (M1=2) or the Manual (M) Mode (M1=3) (i.e., if bit 1 of mode register M1 is "1"), the MCU moves to step S417. On the other hand, if it is the Program (P) Mode (M1=0) or the Shutter Priority (S) Mode (M1=1) (i.e., if bit 1 of mode register M1 is "0"), the MCU moves directly to step S418. At step S417, the AV value (aperture setting value) is changed. That is, during the operation of switch SW5, the aperture setting value is decreased one step-down count, and during the operation of switch SW6, the aperture setting value is increased one step-up count.

At step S418, the MCU determines if either the Shutter Priority (S) Mode or the Manual (M) Mode is the current control mode. If either the Shutter Priority (S) Mode (M1=1) or the Manual (M) Mode (M1=3) is the current control mode (i.e., bit 0 of mode register M1 is "1"), the MCU moves to 419. On the other hand, if the Program (P) Mode (M1=0) or the Aperture Priority (A) Mode (M1=2) is the current control mode (i.e., bit 0 of mode register M1 is "0"), the MCU returns. At step S419, the TV value (shutter speed) is changed. That is, during the operation of switch SW3, the AV setting value is decreased one step-down count, and during the operation of switch SW4, the AV setting value is increased one step-up count.

Figures 5A, 5B:
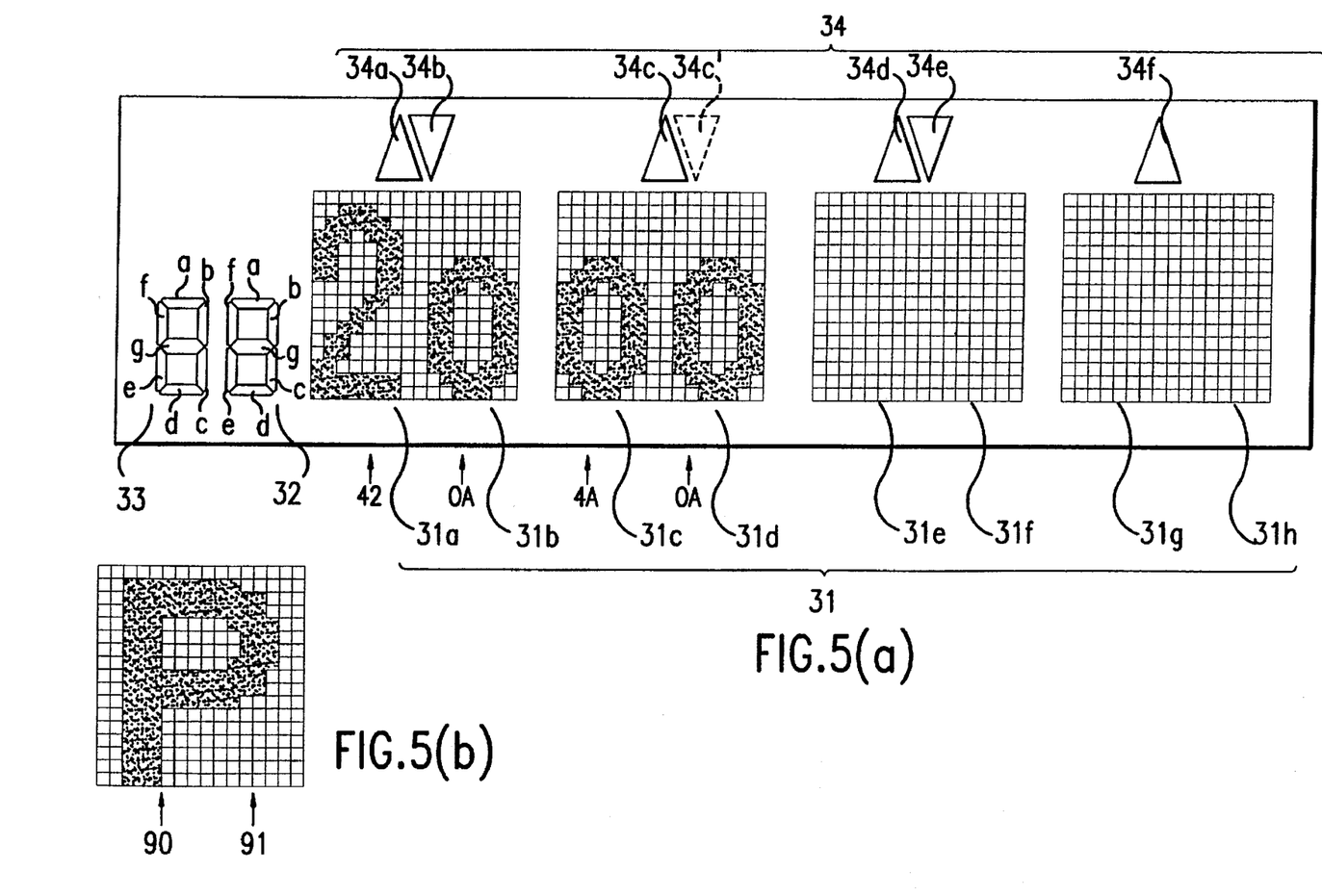
FIGS. 5(a) and 5(b) show the structure of the external display screen of the camera of FIG. 2.

The external LCD display device 14A comprises the dot matrix LCD unit 31 and segment display units 32–34 as shown in FIG. 5(a). The dot matrix LCD unit 31 is comprised of the eight 16×8 dot matrix display units 31a–31h. Thus, display of numerals such as "2" and "0" by a 16×8 dot matrix display unit is possible, as examples 31a–31d indicate. Moreover, each pair of display units 31a and 31b, 31c and 31d, 31e and 31f, and 31g and 31h is immediately adjacent each other, with a slight space between the four pairs, thus enabling display of larger characters or symbols such as "P" on a 16×16 combined dot matrix display block, as shown in FIG. 5(b). The dot matrix LCD unit 31 comprises eight 16×8 dot matrix display units that are driven by 16 common terminals and 8×8=64 segment terminals with a 1/16 duty cycle.

Segment display units 32 and 33 are known segment display units and comprise seven segments a–g each. 34a–34f are one segment display units enabling triangle displays over the four 16×16 dot matrix display blocks in the dot matrix LCD unit 31. Segment display units 32–34 comprise a total of 20 segments. In these segment display units 32–34, common terminals are shared with the dot LCD display unit 31 and are driven with a 1/16 duty cycle. In this case, the minimum number of segment terminals is 2, but it can be more than 2, especially to provide more freedom in wiring. In the present embodiment, seven COM terminals (COM0–COM6) are shared, and there are three segment terminals (SEG64–SEG66), as illustrated in Table 5. In other words, segment display units 32–34 in the present embodiment are equivalent to the dot matrix of Table 5, with the exception of one segment having a different size.

TABLE 5

|       | COM6 | COM5 | COM4 | COM3 |
|-------|------|------|------|------|
| SEG64 | 32g  | 32f  | 32e  | 32d  |
| SEG65 | 33g  | 33f  | 33e  | 33d  |
| SEG66 |      | 34f  | 34e  | 34d  |

|       | COM2 | COM1 | COM0 |
|-------|------|------|------|
| SEG64 | 32c  | 32b  | 32a  |
| SEG65 | 33c  | 33b  | 33a  |
| SEG66 | 34c  | 34b  | 34a  |

If the common terminals in segment display units 32–34 are driven independently of the common terminals in the dot matrix LCD unit 31, only the characteristics of segment display units 32–34 may be improved. However, if the characteristics of the dot matrix LCD unit 31 are improved, it becomes unnecessary to do so. The circuit is simplified if the common terminals in segment display units 32–34 are shared. In this case, segment display units 32–34 are considered to differ from the dot matrix LCD unit 31 only in shape.

TABLE 6

| MCU DATA | COMMAND | INTERNAL CONTENTS |
|----------|---------|-------------------|
| D 0  | Byte 1  | Data for dot matrix display 31a |
| D 1  | Byte 2  | Data for dot matrix display 31b |
| D 2  | Byte 3  | Data for dot matrix display 31c |
| D 3  | Byte 4  | Data for dot matrix display 31d |
| D 4  | Byte 5  | Data for dot matrix display 31e |
| D 5  | Byte 6  | Data for dot matrix display 31f |
| D 6  | Byte 7  | Data for dot matrix display 31g |
| D 7  | Byte 8  | Data for dot matrix display 31h |
| D 8  | Byte 9  | Data for segment display 32a–32g |
| D 9  | Byte 10 | Data for segment display 33a–33g |
| D 10 | Byte 11 | Data for segment display 34a–34f |

Table 6 shows eleven byte commands that are serial-transferred from the MCU 10 to the LCD driver 14B, the data D0–D10 of the 11 byte commands being stored in the RAM of the MCU 10. The RAM includes regions DA0–DA10, which correspond to portions of the LCD display unit 14A. Dot display corresponding to the character generator address indicated by the data D0 is enabled on the dot matrix display unit 31a by the command transferred at the first byte. Dot display corresponding to the character generator address indicated by the data D1 is enabled on the dot matrix display unit 31b by the command transferred at the second byte. Dot-display corresponding to the character generator address indicated by the data D2 is enabled on the dot matrix display unit 31c by the command transferred at the third byte. Dot display corresponding to the character generator address indicated by the data D3 is enabled on the dot matrix display unit 31d by the command transferred at the fourth byte. Dot display corresponding to the character generator address indicated by the data D4 is enabled on the dot matrix display unit 31e by the command transferred at the fifth byte. Dot display corresponding to the character generator address indicated by the data D5 is enabled on the dot matrix display unit 31f by the command transferred at the sixth byte. Dot display corresponding to the character generator address indicated by the data D6 is enabled on the dot matrix display unit 31g by the command transferred at the seventh byte. Dot display corresponding to the character generator address indicated by the data D7 is enabled on the dot matrix display unit 31h by the command transferred at the eighth byte.

Segments a–g in the seven segment display unit 32 are lighted according to bits 0–6 in the data D8 by the command transferred at the ninth byte. Segments a–g in the seven segment display unit 33 are illuminated according to bits 0–6 in the data D9 by the command transferred at the 10th byte. Segment display units 34a–34f are illuminated according to bits 0–5 in the data D10 by the command transferred at the 11th byte.

Figure 7A:
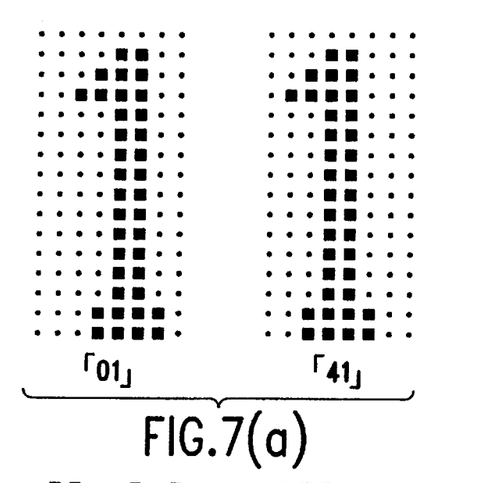
FIGS. 7(a), 7(b) and 7(c) show exemplary display characters from the Table shown in FIG. 11.
Figure 7B:
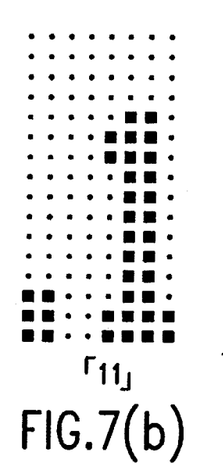
Figure 7C:
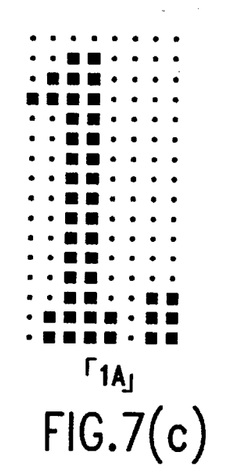
Figure 11:
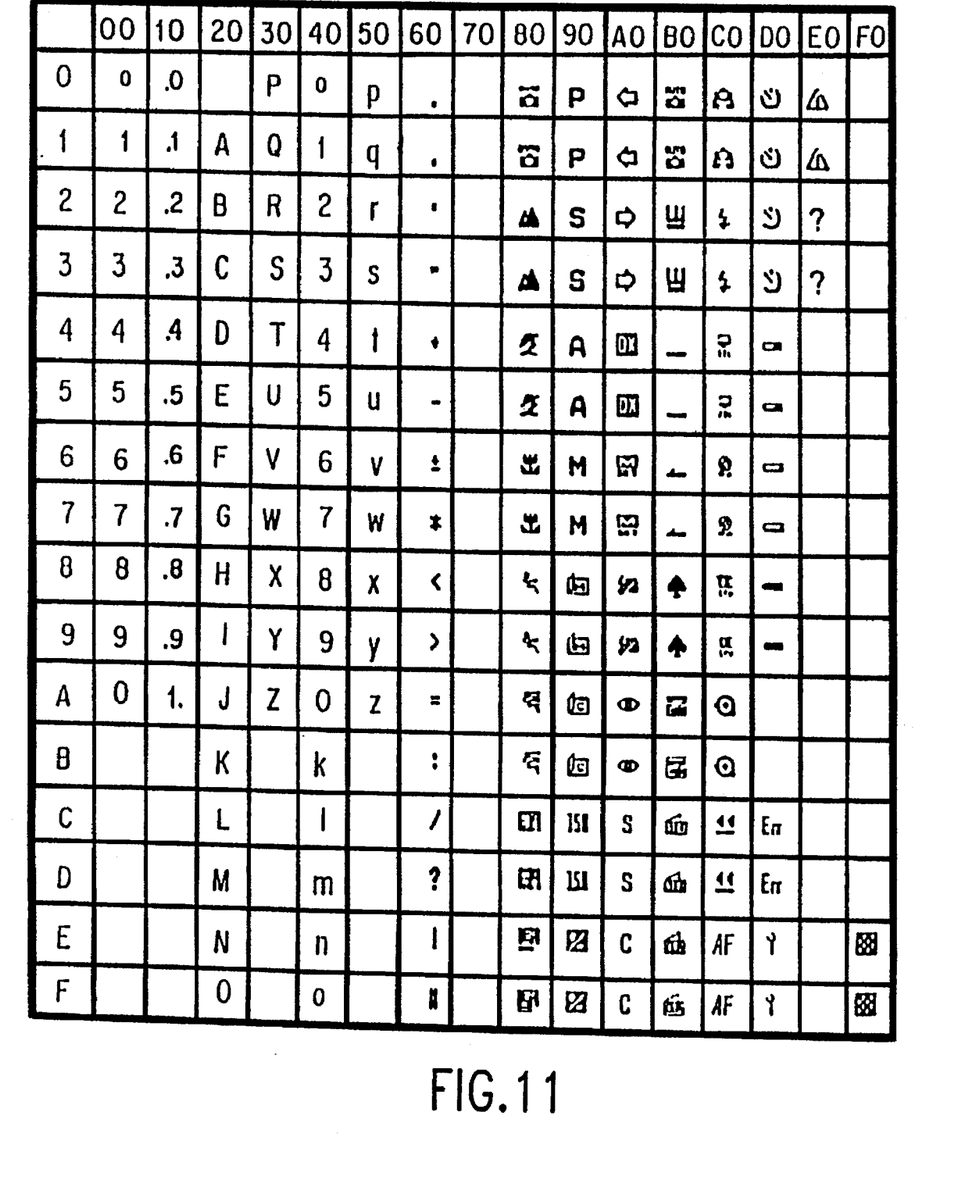
FIG. 11 shows a Table of example display characters and symbols that can be displayed in the display screen of a camera embodying the present invention.

The Table shown in FIG. 11 shows the display character patterns established by the character generator in the LCD driver 14B. The display characters are identified by two digit codes, wherein the row corresponds to the second digit and the column corresponds to the first digit. In the present embodiment, 256 different patterns can be determined according to the table. The numerical character patterns in column 00 and in column 40 have the same basic display pattern, but the display positions are shifted slightly in the horizontal direction, as illustrated in FIG. 7(a). The numerical character patterns in column 10 between rows 0 and 9 contain decimal points as illustrated in FIG. 7(b), and the size of the numerals is smaller than that of a numeral without a decimal point. The numerical character pattern corresponding to column 10, row A contains a decimal point as illustrated in FIG. 7(c), and the size of the numeral is the same as that of a numeral without a decimal point.

Figure 8A:
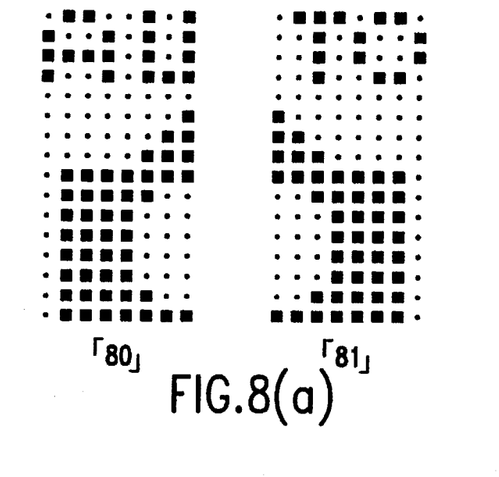
FIGS. 8(a) and 8(b) show a control mode symbol comprised of two portions, each of the symbol portions being displayed in separate dot matrix display units to form the entire symbol.
Figure 8B:
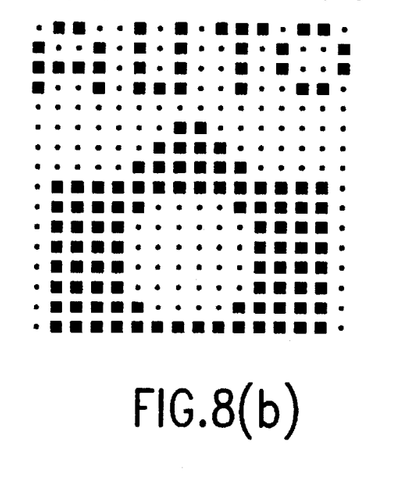

The display patterns in columns 80–F0 have the same patterns repeated twice, but this is only for ease of explanation. In reality, the left half of the pattern is stored in the table at the position corresponding to the first of the two repeated patterns, and the right half of the pattern is stored in the position corresponding to the second of the two repeated patterns. A single display pattern, such as the one presented in FIG. 8(b), is created by combining the left and the right halves as a pair. Moreover, the parts of the dot matrix displays indicated by "." in FIGS. 7(a)–7(b) and 8(a) and 8(b) are blank spaces in reality. In order to show dot placement in an easily understood manner, "." is used in the drawings.

For example, when the value "02" is transferred as the data D0, "2" appears on the dot matrix display unit 31a. The first numeral indicates the column, and the second numeral indicates the row. Furthermore, if "90" is transferred as the data D0, and "91" is transferred as the data D1, a large "P" appears on dot matrix display segments 31a and 31b. Half of the "P" will appear in dot matrix display unit 31a, and the other half of the "P" will appear in dot matrix display unit 31b.

Figure 6:
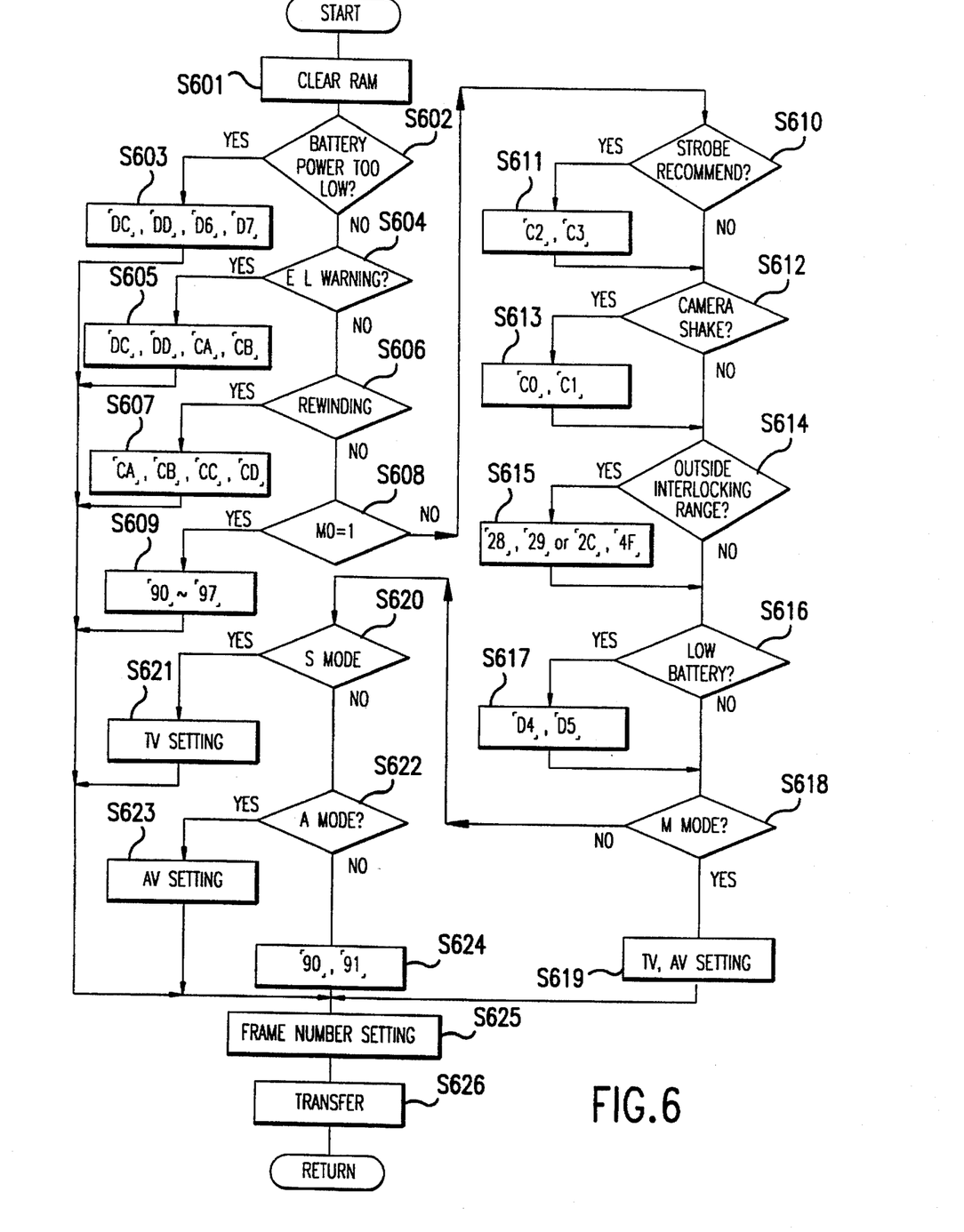
FIG. 6 is a flow chart illustrating the display routine of the control unit of the camera of FIG. 2.

FIG. 6 is a flow chart illustrating the display routine of the MCU 10, which is called into the present program as a subroutine during the "control" time at step S304 in FIG. 3. During this subroutine, the RAM DA0–DA10, which stores the data D0–D10 that is to be transferred to the LCD driver 14B, is cleared at step S601. At this time, "20", which is a blank display, is set for DA0–DA7, and "0" is set for all of DAB–DA10, to indicate light off. At step S602, bit 0 of the release prohibiting register M2 is checked. If the bit is "1", indicating a "No Battery Power Remaining" condition, the MCU moves to step S603, and if the bit is "0" it moves to step S604. At step S603, the MCU records the values corresponding to positions "DC," "DD," "D6" and "D7" of the Table of FIG. 11 to the RAM regions DA4, DA5, DA6 and DA7 as data D4, D5, D6 and D7 to cause the "No Battery Power Remaining" symbol to be displayed, and the MCU then advances to step S625.

At step S604, bit 1 of the release prohibiting register M2 is checked. If the bit is "1", indicating a "Easy Loading Warning" condition, the MCU moves to step S605, and if the bit is "0", it moves to step S606. At step S605, the MCU records the values corresponding to positions "DC," "DD," "CA" and "CB" of the Table of FIG. 11 in the RAM regions DA4, DA5, DA6 and DA7 as data D4, D5, D6 and D7 to cause the "Easy Loading Warning" symbol to be displayed, and the MCU then advances to step S625. At step S606, bit 2 of the release prohibiting register M2 is checked. If the bit is "1," indicating the camera is in the "Rewinding" condition, the MCU moves to step S607, and if the bit is "0," it moves to step S608. At step S607, the MCU records the values corresponding to positions "CA," "CB," "CC" and "CD" of the Table of FIG. 11 in the RAM data regions DA4, DA5, DA6 and DA7 as data D4, D5, D6 and D7 to cause the "Easy Loading Warning" symbol to be displayed, and the MCU then advances to step S625. At step S608, the status register M0 is checked. If the register is "1" indicating the "Non-Selected" condition, the MCU moves to step S609, and if the register is "0" indicating the "Selected" condition, the MCU advances to step S610.

At step S609, the MCU records the values corresponding to positions "90"–"97" of the Table of FIG. 11 in the RAM data regions DA0–DA7 as data D0–D7 D7 to cause "P," "S," "A" and "M" to be displayed. Furthermore, in order to cause four triangles to appear above the dot matrix display units 31a–31h, the MCU records the binary number "101101" in the data region DA10 as data D10, which illuminates the segment display units 34f, 34d, 34c and 34a. Moreover, the MCU records the binary number "000000" the next round of step S609 to cause the triangles to flash on and off, and the MCU then moves to step S625.

At step S610, bit 0 of the warning register M3 is checked. If the bit is "1" and in the "Strobe Recommended" condition, the MCU moves to step S611, and if the bit is "0," it moves to step S612. At step S611, the MCU records the values corresponding to positions "C2" and "C3" of the Table shown in FIG. 11 in the RAM data regions DA0 and DA1 as data D0 and D1 to cause the "Strobe Recommended" symbol to be displayed, and the MCU then advances to step S612. At step S612, bit 1 of the warning register M3 is checked. If the bit is "1" and in the "Camera Shake Warning" condition, the MCU moves to step S613, and if the bit is "0," it moves to step S614. At step S613, the MCU shifts the data stored in the data regions DA0–DA7 by two bytes. In other words, the MCU transfers data D0 and D1 to the data regions DA2 and DA3. Next, the MCU records the values corresponding to positions "C0" and "C1" of the Table shown in FIG. 11 in the RAM data regions DA0 and DA1 as data D0 and D1 to cause the "Camera Shake Warning" symbol to be displayed, and the MCU then advances to step S614.

At step S614, bit 2 and 3 of the warning register M3 are checked. If either of the bits is "1" indicating the "Outside Interlocking Range" condition, the MCU moves to step S615, and if both bits are "0," it moves to step S616. At step S615, the MCU shifts the data stored in the data regions DA0–DA7 by two bytes, and if bit 2 of the warning register M3 is "1" and in the "Outside High Illumination Interlocking Range" condition, the MCU records the values corresponding to positions "28" and "29" of the Table shown in FIG. 11 in the RAM data regions DA0 and DA1 as data D0 and D1 to cause the symbols "HI" to be displayed. If bit 2 of the warning register M3 is "1" indicating the "Outside Low Illumination Interlocking Range" condition, the MCU records the values corresponding to positions "2C" and "2F" of the Table shown in FIG. 11 in the RAM data regions DA0 and DA1 as data D0 and D1 to cause the symbols "LO" to be displayed, and the MCU then advances to step S616.

At step S616, bit 4 of the warning register M3 is checked. If the bit is "1" indicating the "Battery Power Is Low" condition, the MCU moves to step S617, and if the bit is "0," it moves to step S618 At step S617, the MCU shifts the data stored in the data regions DA0–DA7 by two bytes, and the MCU records the values corresponding to positions "D4" and "D5" of the Table shown in FIG. 11 in the RAM data regions DA0 and DA1 as data D0 and D1 to cause the Low Battery Power symbol to be displayed, and the MCU moves to step S618. At step S618, the mode register M1 is checked. If the register is 3 and in Manual (M) Mode, the MCU moves to step S619; otherwise, it moves to step S620. At step S619 the MCU records the TV (shutter speed) setting value and the AV (aperture) setting value in the RAM data regions DA0–DA7.

If "2000" is set as the TV value and "F5.6" is set as the AV value, for example, the MCU records the values corresponding to positions "42," "0A," "4A," "0A," "26," "05," "16" and "20" of the Table of FIG. 11 in the data regions DA0–DA7. In this case, data of 8 bytes are newly set, and all the displays established in steps 610 through 617 will be ignored. Moreover, the Manual (M) Mode enables the setting of the TV value and the AV value. The MCU sets the binary number "110110" in the data region DA10, enabling the lighting of segment display units 34f, 34e, 34c and 34b.

Here, in displaying "2000," positions "0A" and "4A" are used to display the same "0". This is because providing middle space in the mixture of 16×16 display blocks and 16×8 display units, as illustrated in FIG. 7, makes a better balanced display. The shape of "4A" is the same as "0A," but "4A" is shifted one pixel to the left. As a result, spacing between between digits is more balanced in the display.

At step S620, the mode register M1 is checked. If M1 is "1" indicating that the Shutter Priority (S) mode is selected, the MCU advances to step S621; otherwise, it moves to step S622. At step S621, the MCU shifts the data stored in the data regions DA0–DA7 by four bytes and records the TV setting value in the RAM data regions DA0–DA3. For example, if "2000" is set as the TV value, the MCU records the values corresponding to positions "42," "0A," "4A" and "0A" of the table of FIG. 11 in the data regions DA0–DA3. In this case, the shifting of four bytes causes the data established beforehand in the data regions DA4–DA7 to be replaced by the data shifted by four bytes. Thus, the display established in steps 610 through 613 may be ignored depending on the settings of steps 614 through 617. Needless to say, if there is no warning condition, only the shutter speed is displayed. Furthermore, the Shutter Priority (S) Mode can also establish the TV value. The MCU records the binary number "000110" in the RAM data region DA10, enabling the lighting of segment display units 34b and 34c.

At step S622, the mode register M1 is checked. If M1 is "2" indicating that the Aperture Priority (A) Mode is selected, the MCU advances to step S623; otherwise, (i.e., Program (P) Mode is selected) it moves to step S624. At step S623, the MCU records the AV setting value in the RAM data regions DA4–DA7. For example, if "F5.6" is set as the AV value, the MCU records the values corresponding to positions "26," "05," "16" and "20" of the table of FIG. 11 in the data regions DA4–DA7. In this case, the four byte data established beforehand in the data regions DA4–DA7 are newly established. Thus, the display established in steps 610 through 613 may be ignored depending on the settings of steps 614 through 617. If there is no warning condition, only the aperture setting value is displayed. Furthermore, the Aperture Priority (A) Mode can also establish the AV value. The MCU records the binary number "110000" in the RAM data region DA10, enabling the lighting of segment display units 34e and 34f.

At step S624, the data stored in the data regions DA0–DA7 are shifted two bytes, and the MCU records the values corresponding to positions "90" and "91" of the table of FIG. 11 in the RAM data regions DA0 and DA1 to cause "P" to be displayed in the dot matrix display units 31a and 31b. If there is no warning condition present, only "P" is displayed. In this case, the two byte data established at the beginning in DA6 and DA7 are ignored, and if the data are set in steps 612 through 617, the contents of the data established in step S611 cannot be displayed. Furthermore, when the Program (P) Mode is selected, the user cannot set the TV value or the AV value. The MCU records the binary number "000000" in the RAM data region DA10, which causes all the segment display units 34f–34a to be turned off.

At step S625, the MCU sets the frame number data in the RAM data regions DA8 and DA9. To display the number "24," the binary number "1100110" is recorded in the data region DA8 to light segments 32g, 32f, 32c and 32b, and the binary number "1011011" is recorded in the RAM data region DA9 to light segments 33g, 33e, 33d, 33b and 33a. At step S626, the data D0–D10 of the RAM data regions DA1–DA10 set in steps 601–625 are transferred to the LCD driver 14B, enabling display on the external LCD display device 14A.

Figure 1:
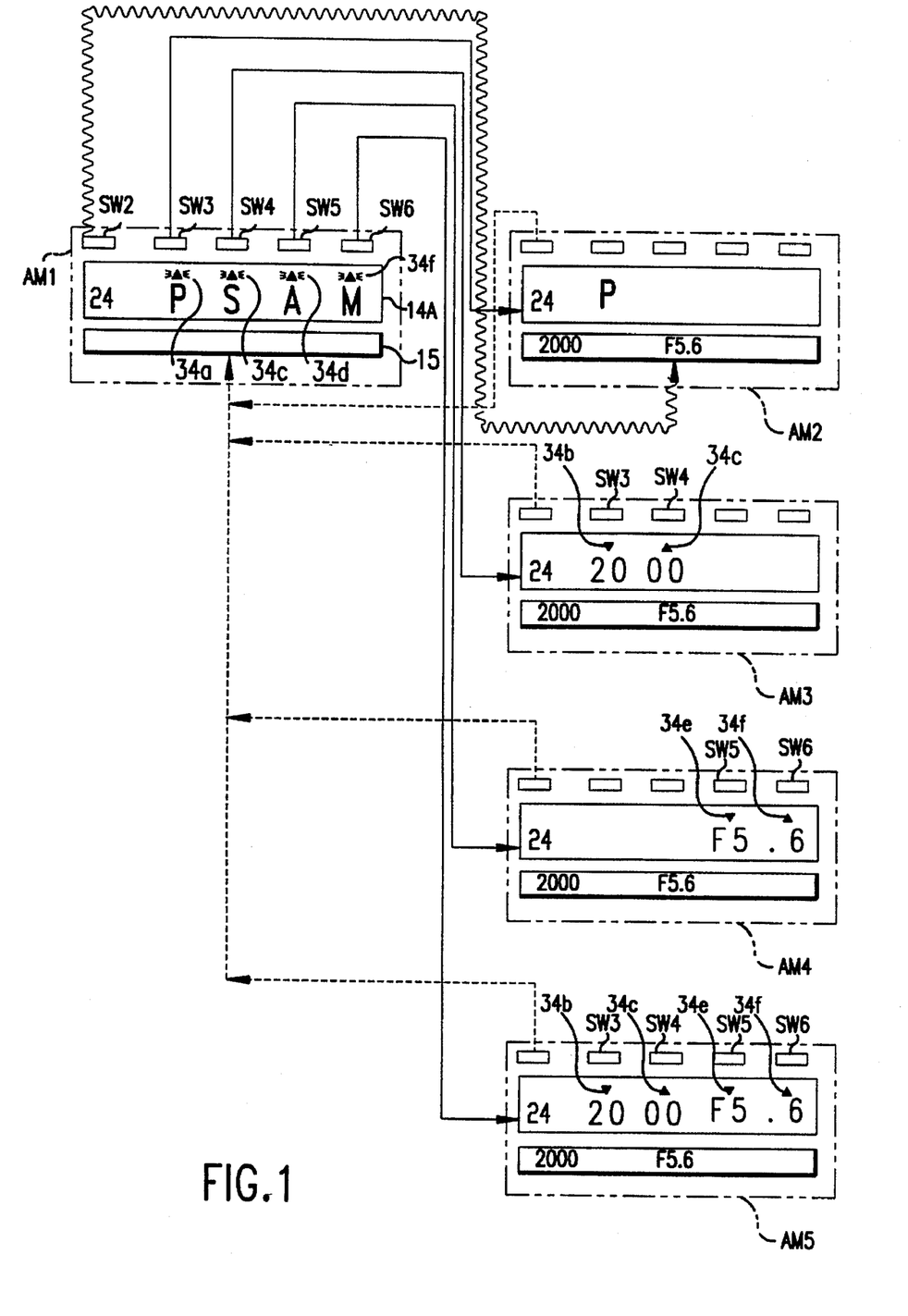
FIG. 1 is a diagram showing the correspondence between the display conditions of the display screen and switch operation of the operation devices in a camera embodying the present invention.

FIG. 1 illustrates the correspondence between the display condition and switch operation. In FIG. 1, each of the display blocks AM1–AM5 presents a display condition with the top rectangle of each block showing switches SW2–SW6, the inside of the middle rectangle showing the external LCD display device 14A, and the interior of the bottom rectangle showing the finder display unit 15, respectively. As FIG. 1 and FIG. 5 show, in the present embodiment, switch SW3 corresponds to the first 16×16 display block, comprising dot matrix display units 31a and 31b; switch SW4 corresponds to the second 16×16 display block comprising dot matrix display units 31c and 31d; switch SW5 corresponds to the third 16×16 display block comprising dot matrix display units 31e and 31f; and switch SW6 corresponds to the fourth 16×16 display block comprising dot matrix display units 31g and 331h.

Switches SW3–SW6 function as first through fourth operation means for selecting a control mode or for changing a displayed camera setting value. The segment display units 34a–34f function as mark display means for indicating which of the switches to operate to select a control mode or to change a displayed setting value. Segment display units 34a and 34b are provided between switch SW3 and the first display block comprised of dot matrix display units 31a and 31b. Segment display unit 34c is provided between switch SW4 and the second display block comprised of dot matrix display units 31c and 31d. Segment display units 34d and 34e are provided between switch SW5 and the third display block comprised of dot matrix display units 31e and 31f. Segment display unit 34f is provided between switch SW6 and the fourth display block comprised of dot matrix display units 31g and 31g.

The display condition of the external LCD display device 14A shown in display block AM1 describes the condition prior to control mode selection. In this condition, control mode symbols "P," "S," "A," and "M," indicating the control mode names, are displayed on the first, second, third and fourth display blocks, respectively. At the same time, segment display units 34a, 34c, 34d and 34f flash and point to switches SW3, SW4, SW5 and SW6, respectively. Thus, the correspondence between switches SW3–SW6 and the control mode names being displayed on the first–fourth display blocks is clearly indicated by segment display units 34a, 34c, 34d and 34f.

If switch SW3 is turned on during the condition prior to selection of the control mode, the Program (P) Mode is selected, and the external LCD display device 14A presents the display condition illustrated in display block AM2, for example. If switch SW4 is turned on, the Shutter Priority (S) Mode is selected, and the external LCD display device 14A presents the display condition illustrated in display block AM3, for example. If switch SW5 is turned on, the Aperture Priority (A) Mode is selected, and the external LCD display device 14A presents the display condition illustrated in display block AM4, for example. If switch SW6 is turned on, the Manual (M) Mode is selected, and the external LCD display device 14A presents the display condition illustrated in display block AM5, for example.

Figure 10A:
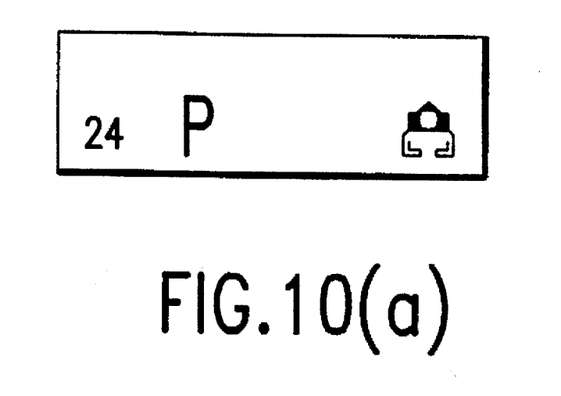
FIGS. 10(a) and 10(b) show examples of control mode symbols and camera setting values, respectively, displayed in a display screen of a camera embodying the present invention.

In the display condition illustrated in display block AM2, the control mode name symbols ("S," "A" and "M") on the second-fourth display blocks disappear, leaving only the control name display "P" on the first display block. Moreover, segment display units 34a, 34e, 34d and 34f are turned off. Thus, the selection condition of the Program (P) Mode is displayed. FIG. 10(a) is an example of the display showing the Camera Shake Warning symbol in the fourth display block during selection of the P mode.

In the display condition illustrated in display block AM3, the Shutter Priority "S" Mode has been selected. This allows the user to specify the shutter speed setting. The current shutter setting speed is displayed as "2000," for example, on dot matrix display units 31a, 31b, 31c and 31d (i.e., on the first and second display blocks). At the same time, the segment display unit 34b is illuminated above the first display block (on which "20" is displayed), and the segment display unit 34c is illuminated above the second display block (on which "00" is displayed). The segment display unit 34b indicates that switch SW3 may be used as an operation means to decrease the shutter speed setting. Moreover, the segment display unit 34c, indicates that switch SW4 may be used as an operation means to increase the shutter speed setting.

In the display condition illustrated in display block AM4, the Aperture Priority (A) Mode has been selected. This allows the user to select the aperture setting. The current aperture setting value is displayed as "F5.6," for example, on dot matrix display units 31e, 31f, 31g and 31h (i.e., on the third and the fourth display blocks). At the same time, the segment display unit 34e is illuminated above the third display block on which "F5" is displayed, and the segment display unit 34f lights up above the fourth display block on which "0.6" is displayed. The segment display unit 34e indicates that switch SW5 may be used as an operation means to reduce aperture setting. Moreover, the segment display unit 34f indicates that switch SW6 may be used as an operation means to increase the aperture setting.

In the display condition illustrated in block AM5, the Manual ("M") Mode has been selected. The manual mode allows the user to select both the shutter speed and aperture settings. The current shutter setting speed is displayed as "2000," for example, on the first and the second display blocks, and the current aperture setting value is displayed as "F5.6," for example, on the third and the fourth display blocks. Moreover, the segment display unit 34b is illuminated above the first display block on which "20" is displayed; the segment display unit 34c is illuminated above the second display block on which "00" is displayed; the segment display unit 34e is illuminated above the third display block on which "F5" is displayed; and the segment display unit 34f is illuminated above the fourth display block on which "0.6" is displayed.

Figure 10B:
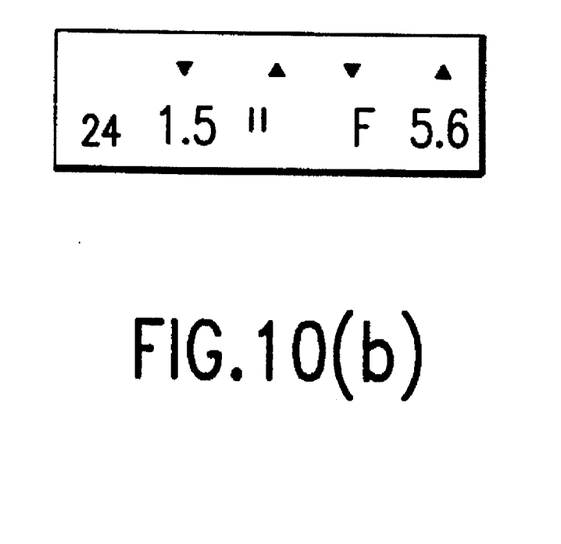

The segment display unit 34b indicates that switch SW3 may be used as an operation means to reduce the shutter speed setting; and the segment display unit 34c indicates that switch SW4 may be used as an operation means to increase the shutter speed setting. The segment display unit 34e indicates that switch SW5 may be used as an operation means to reduce the aperture setting; and the segment display unit 34f indicates that switch SW6 may be used as an operation means to increase the aperture setting. Another example of the LCD display during the Manual (M) Mode selection is presented in FIG. 10(b).

In the present embodiment, the P mode is selected by switch SW3, S mode is selected by switch SW4, the A mode is selected by switch SW5, and the M mode is selected by switch SW6. The correspondence between switches SW3-SW6, and the control mode names displayed on the first fourth display blocks, however, can be established arbitrarily. Moreover, in the present embodiment, if the S mode is selected, for example, the display condition of the LCD display changes to the display illustrated in display block AM3. In this condition, the segment display unit 34b (a triangle pointed down) is illuminated above the first display block on which "20" is displayed, and the segment display unit 34c (a triangle pointed up) is illuminated above the second display block on which "00" is displayed. However, a segment display unit 34c' (shown in broken lines), having a triangle shape pointed down (like the segment display unit 34b), could be provided above the second display block. If a display unit 34c' is provided, the segment display unit 34a can be illuminated above the first display block, and the segment display unit 34c' can be illuminated above the second 16×16 dot display block. In this case, the segment display unit 34a would indicate that switch SW3 may be used as an operation means to increase the shutter speed setting, and the segment display unit 34c' would indicate that switch SW4 may be used as an operation means to decrease the shutter speed setting.

It is clear from the above explanations that, in the present embodiment, during the first display condition, the first--fourth control mode names are displayed on the first-fourth display blocks, with the pairs of 8×16 dot matrix display units comprising the individual first-fourth 16×16 dot matrix display blocks; the first-fourth operation means being pointed to by the first-fourth mark display means, which are provided above the first-fourth display blocks. Moreover, the correspondence between the first-fourth operation means and the control mode names displayed on the first--fourth display blocks is clarified by the first-fourth mark display means, thus enabling immediate selection of the desired control mode by operation of the first-fourth operation means.

Furthermore, during the second display condition, after control mode selection by operating the first-fourth operation means, numerical values are displayed by using the first-eighth 16×8 dot display units as a single display unit. At the same time, the operation means that enables a setting change and the direction of the setting change of the numerical value displayed on the display units are indicated by a mark display means provided above each of the first-fourth display blocks. Also, the correspondence between the operation means and the display blocks on which the numerical values are displayed, as well as the direction of the change in the setting of the numerical values caused by operating the operating means, are clarified by the mark display means, thus enabling simple and easy-to-understand execution of changes of the displayed numerical values (setting values). Moreover, since the operation means and the display blocks use the same operation parts and display parts, the number of operation parts and display parts are reduced by combining functions, thus preventing the cost and size of the camera from increasing.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A display and selection system for selecting a control mode and for setting an operational parameter of a camera capable of operating in a plurality of control modes, the display and selection system comprising:

a plurality of switches for selecting control modes and setting operational parameters of the camera;

a display screen for displaying symbols and numerals indicative of control modes and operational parameters of the camera, the display screen having first and second display conditions and comprising:

a plurality of display blocks, each of the plurality of display blocks corresponding to and laterally adjacent at least one of the plurality of switches, and a plurality of display indicators, at least one of the plurality of display indicators corresponding to each of the plurality of display blocks, each of the plurality of display indicators also corresponding to one of the plurality of switches and being located between said corresponding switch and said display block to indicate location of said corresponding switch; and a control system for selecting the control mode of the camera when the display screen is in the first display condition, and for changing at least one operational parameter of the camera when the display screen is in the second display condition;

wherein a plurality of control mode symbols are displayed on the display screen when the display screen is in the first display condition, each control mode symbol being displayed on one of the plurality of display blocks, a control mode being selectable by operation of the switch corresponding to the display block displaying the control mode symbol; and wherein at least one operational parameter is displayed on the display screen during the second display condition, the at least one operational parameter being changeable by operation of a switch corresponding to a display block on which the at least one operational parameter is displayed.

2. The display and selection system of claim 1, wherein when the display screen is in the first display condition, display indicators corresponding to display blocks displaying a control mode symbol flash on and off to indicate those switches that may be operated to select a control mode.

3. The display and selection system of claim 1, wherein when the display screen is in the second display condition, display indicators corresponding to display blocks displaying an operational parameter flash on and off to indicate those switches that may be operated to change an operational parameter.

4. The display and selection system of claim 1, wherein when the display screen is in the second display condition, the display indicators corresponding to each switch indicate how the at least one operational parameter will be changed by operation of each switch.

5. The display and selection system of claim 1, wherein each display indicator is triangular and points toward or away from a corresponding switch, and wherein when the display screen is in the second display condition, the orientation of the triangle indicates how an operational parameter displayed on a display block corresponding to the switch will be changed by operation of the switch.

6. The display and selection system of claim 5, wherein when the display screen is in the second display condition, a triangular display indicator pointing toward a switch indicates that operation of the switch will increase the value of an operational parameter displayed on the display block corresponding to the switch, and a triangular display indicator pointing away from a switch indicates that operation of the switch will decrease the value of an operational parameter displayed on the display block corresponding to the switch.

7. A display and selection system for selecting a control mode and for setting an operational parameter of a camera capable of operating in a plurality of control modes, the display and selection system comprising:

a plurality of selection means for selecting control modes and setting operational parameters of the camera;

display means for displaying symbols and numerals indicative of control modes and operational parameters of the camera, the display means having first and second display conditions and comprising:

a plurality of display block means for displaying a symbol or numerals, each of the plurality of display block means corresponding to and laterally adjacent at least one of the plurality of selection means, and a plurality of indicator means for indicating which of the plurality of selection means corresponds to each of the plurality of display block means, each of said plurality of indicator means being located between a corresponding one of said plurality of display block means and a corresponding one of said plurality of selection means; and control means for selecting the control mode of the camera when the display means is in the first display condition, and for changing at least one operational parameter of the camera when the display means is in the second display condition;

wherein a plurality of control mode symbols are displayed on the display means when the display means is in the first display condition, each control mode symbol being displayed on one of the plurality of display block means, a control mode being selectable by operation of the selection means corresponding to the display block means displaying the control mode symbol; and wherein at least one operational parameter is displayed on the display means during the second display condition, the at least one operational parameter being changeable by operation of a selection means corresponding to a display block means on which the at least one operational parameter is displayed.

8. The display and selection system of claim 7, wherein when the display means is in the first display condition, indicator means corresponding to display block means displaying a control mode symbol flash on and off to indicate that the selection means corresponding to the display block means displaying a control mode symbol may be operated to select a control mode.

9. The display and selection system of claim 7, wherein when the display means is in the second display condition, indicator means corresponding to display block means displaying an operational parameter flash on and off to indicate that the selection means corresponding to the indicator means displaying an operational parameter may be operated to change an operational parameter.

10. The display and selection system of claim 7, wherein when the display means is in the second display condition, the indicator means corresponding to each selection means indicates how the at least one operational parameter will be changed by operation of each selection means.

11. The display and selection system of claim 7, wherein each indicator means is triangular and points toward or away from a corresponding selection means, and wherein when the display means is in the second display condition, the orientation of each triangular indicator means indicates how an operational parameter displayed on a display block means corresponding to the selection means will be changed by operation of the selection means.

12. The display and selection system of claim 11, wherein when the display means is in the second display condition, a triangular indicator means pointing toward a selection means indicates that operation of the selection means will increase the value of an operational parameter displayed on the display block means corresponding to the selection means, and a triangular indicator means pointing away from a selection means indicates that operation of the selection means will decrease the value of an operational parameter displayed on the display block means corresponding to the selection means.

13. A method for selecting a control mode of a camera capable of operating in at least two control modes, comprising the steps of:

displaying a plurality of control mode symbols on a display screen of the camera located laterally adjacent a plurality of switches on the camera, each control mode symbol corresponding to a separate control mode of the camera, each control mode symbol corresponding to at least one of the plurality of switches;

displaying a plurality of indicators on the display screen, each indicator corresponding to a control mode symbol and being located between one of said control mode symbols and a corresponding one of said plurality of switches, each indicator indicating which of the plurality of switches on the camera corresponds to each of the plurality of control mode symbols; and operating one of the plurality of switches to select the control mode represented by the control mode symbol corresponding to the operated switch.

14. A method for changing an operational parameter of a camera, comprising the steps of:

displaying an operational parameter of the camera on a display screen of the camera located laterally adjacent a plurality of switches on the camera, the operational parameter corresponding to at least two of the plurality of switches;

displaying a plurality of indicators on the display screen, at least two indicators corresponding to the operational parameter being located between the displayed operational parameter and the at least two of the plurality of switches and indicating that the at least two switches may be used to change the value of the operational parameter;

causing the indicators corresponding to the displayed operational parameter to blink to indicate that the operational setting may be changed by operation of the at least two switches; and operating at least one of the at least two switches to change the value of the operational parameter.

* * * * *